United States Patent [19]

Stiltz et al.

[11] 4,156,468

[45] May 29, 1979

[54] HOUSING FOR ELECTRIC TOOLS

[75] Inventors: Erwin Stiltz, Winnenden-Schelmenholz; Rudolf Hoyer, Althütte, both of Fed. Rep. of Germany

[73] Assignee: Licentia Patent-Verwaltungs G.m.b.H., Fed. Rep. of Germany

[21] Appl. No.: 819,982

[22] Filed: Jul. 28, 1977

[30] Foreign Application Priority Data

Aug. 6, 1976 [DE] Fed. Rep. of Germany ....... 2635379

[51] Int. Cl.[2] .......................... H02K 7/14; B25D 9/00

[52] U.S. Cl. .................................... 173/118; 173/117; 310/50

[58] Field of Search ............... 173/116, 117, 170, 118, 173/119; 310/50, 47

[56] References Cited

U.S. PATENT DOCUMENTS

| | | | |
|---|---|---|---|
| 2,373,842 | 4/1945 | Mitchell | 173/170 X |
| 3,121,178 | 2/1964 | Seyfried et al. | 310/50 |
| 3,517,755 | 6/1970 | Badcock | 173/117 |
| 3,630,293 | 12/1971 | Moores | 173/117 |
| 3,874,460 | 4/1975 | Schmid et al. | 173/116 X |
| 3,929,195 | 12/1975 | Stiltz et al. | 173/116 X |

FOREIGN PATENT DOCUMENTS

| | | | |
|---|---|---|---|
| 905102 | 9/1962 | United Kingdom | 310/50 |
| 1206853 | 9/1970 | United Kingdom | 173/117 |

*Primary Examiner*—Lawrence J. Staab
*Attorney, Agent, or Firm*—McGlew and Tuttle

[57] ABSTRACT

The housing for electric tools comprises a one-piece plastic construction and includes a handle part and a hollow housing part having a metal jacket therein which defines various cavities and bearing bushes and bores for the elements of a drive motor and an eccentric drive for a hammer drill.

5 Claims, 5 Drawing Figures

2
50
2
4
14
15
10
4
3
5
1
2

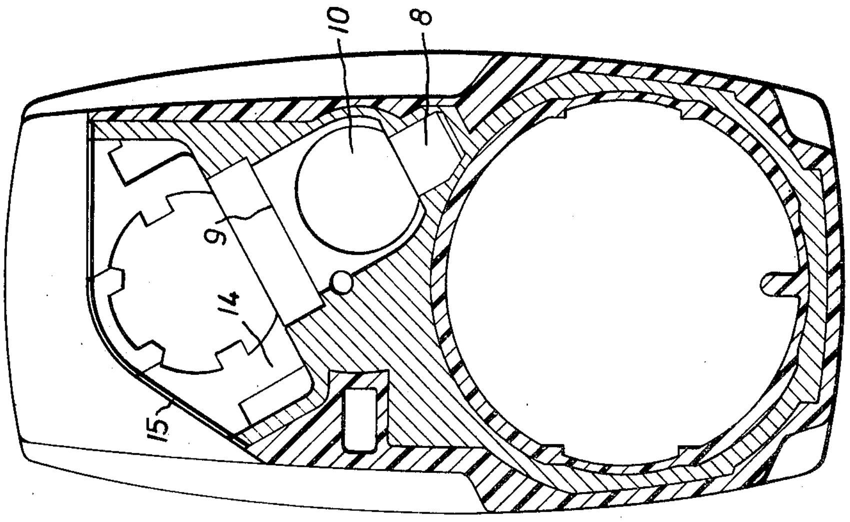
FIG.4
FIG.3
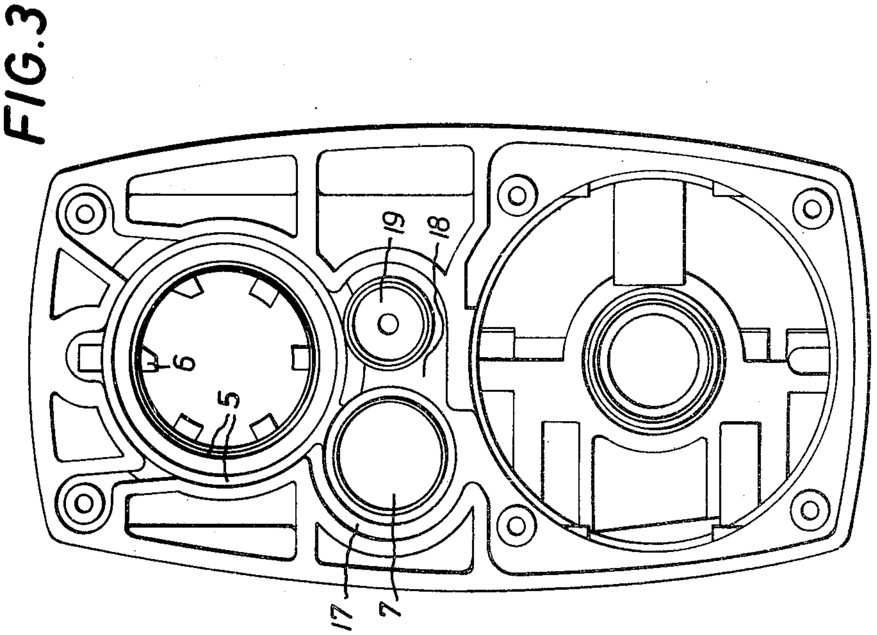

HOUSING FOR ELECTRIC TOOLS

FIELD AND BACKGROUND OF THE INVENTION

This invention relates in general to tool housing constructions and, in particular, to a new and useful housing for electric tools, particularly for hammer drills with an eccentric which is motor-driven over an intermediate shaft and transmission to actuate a driving piston arranged in a cylinder bush acting periodically over a compressible medium on an overhung striking body which is also arranged in the cylinder bush and includes a spindle sleeve which can be set in rotation by the electromotor by a gearing arrangement.

DESCRIPTION OF THE PRIOR ART

The invention is based on the problem of making a hammer drill with a minimum of engineering effort so that it is compact, rugged and lightweight and particularly easy to service.

This problem is solved in that the housing part receiving the driving motor with the handle represents a one-piece assembly of plastic, which is provided with a metal jacket which contains a cylinder guide for the cylinder bush receiving the striking mechanism and which includes the bearings for the eccentric shaft, and a bore for the intermediate shaft bearing as well as a space for receiving the gear.

Rotary sledge hammers are known which have a housing part consisting of a one-part cast or molded piece which supports the drive shaft of the motor and the crank shaft and which forms an angle bearing for a bearing at the end of the motor output shaft in the proximity of the crank shaft, and where the stator sheathing of the electromotor is held radially by the molded piece (German Pat. No. 2,416,191).

Such a rotary sledge hammer has certain advantages in the assembly, since it can be effected relatively rapidly. However, the axial extension of the casing results in a considerable overall length due to the arms required for the support of the crank shaft and, in addition, the arms tend to be subject to bending vibrations excited by the crank shaft, and this can lead to premature breakage of the arms and/or failures of the bearing. Furthermore, the driving motor must be additionally insulated due to the metallic nature of the housing and this requires added costs. Finally, the handle represents a part separate from the housing which must be bolted to the housing or detached from it depending on whether the hammer is assembled or disassembled. This also results in higher costs.

SUMMARY OF THE INVENTION

Compared to rotary sledge hammers of the concept described above, the housing according to the invention is a plastic-metal combination, wherein the metal jacket is surrounded on all sides by the plastic housing and the handle forms a part of the housing. In addition to a relatively more economical and compact design, the electrical part is not separated when the drill hammer is disassembled and even the armature of the driving motor arranged underneath the intermediate shaft remains in the housing.

From a manufacturing point of view, as well as in practical respects, it is of advantage to inject the metal jacket into the housing. According to another idea of the invention, the metal jacket is conceived so that the eccentric shaft is inclined to a plane extending through the longitudinal axis of the housing. This measure results in a particularly low design and thus lightweight construction of the hammer drill.

Accordingly, it is an object of the invention to provide a housing for a hammer drill of a type which includes a drive motor driving an eccentric shaft through an intermediate shaft and intermediate gearing to reciprocate a driving piston which acts periodically through a compressible medium on an overhung striking body and which comprises a one-piece integral plastic housing having a handle part of a hollow housing part with a metal jacket in the hollow housing part defining: an electric motor receiving cavity, a cylinder bush for the reciprocating piston, a gear and eccentric drive cavity between the motor receiving cavity and the cylinder bush, the eccentric drive cavity including a bearing bush portion for the eccentric shaft, a bore for the support of the intermediate shaft and an interior space for the intermediate gearing.

A further object of the invention is to provide a housing for electric tools which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated a preferred embodiment of the invention.

BRIEF DESCRIPTION OF THE DRAWINGS

In the Drawings:

FIG. 3 is an end elevational view of the housing shown in FIG. 1;

FIG. 4 is a section taken along the line 4—4 of FIG. 1; and

DESCRIPTION OF THE PREFERRED EMBODIMENT

Figure 1:
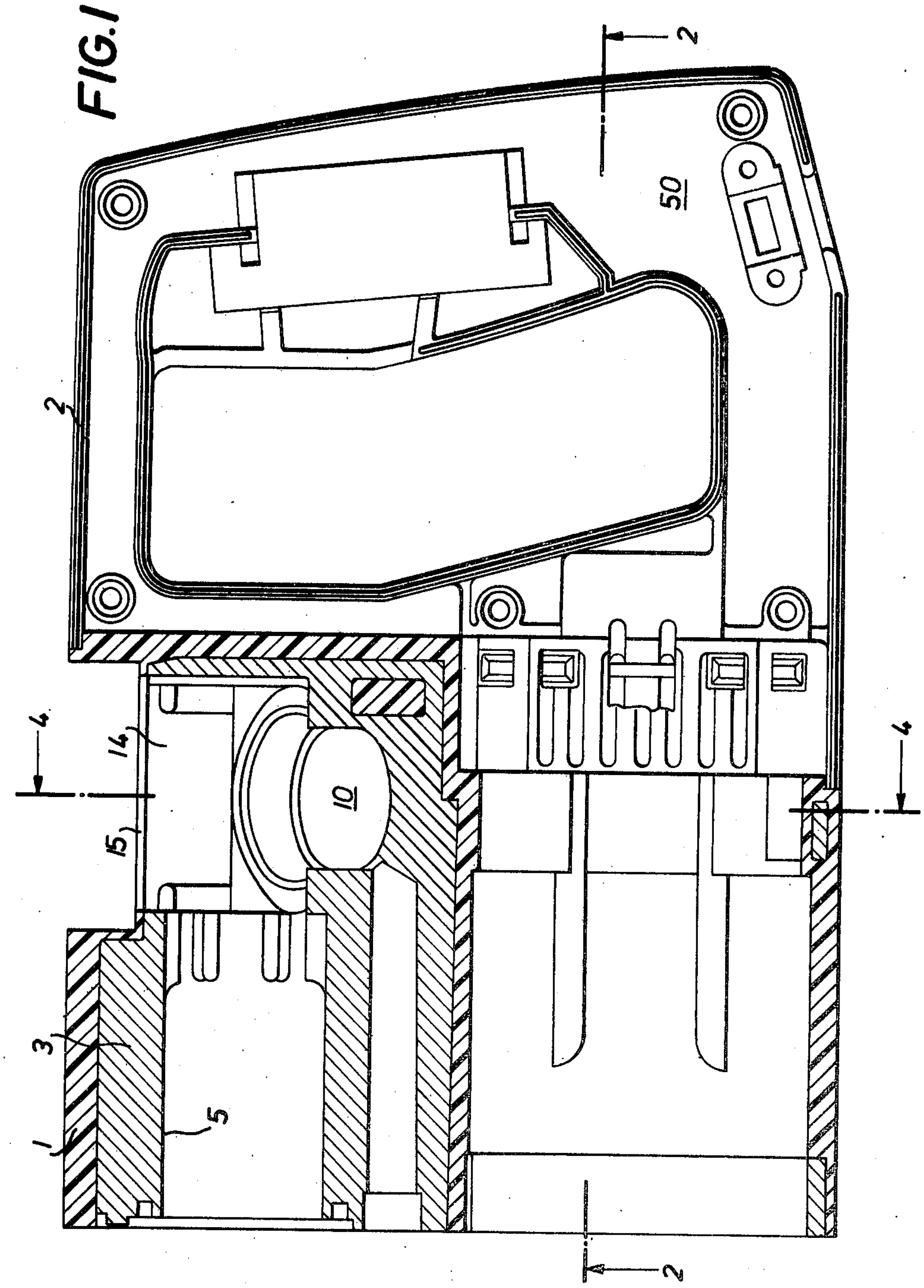
FIG. 1 is a longitudinal sectional view of a tool housing constructed in accordance with the invention.

Referring to the drawings in particular, the invention embodied therein, comprises a housing which includes a hollow housing part 1 and a handle part 2. The housing is particularly for an electric tool, such as a hammer drill.

Figure 2:
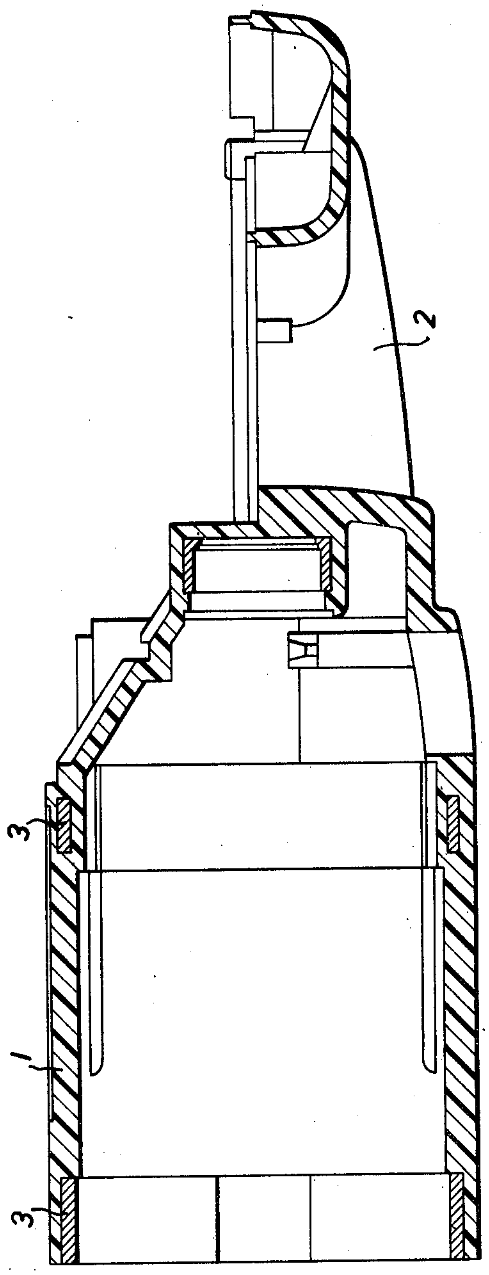
FIG. 2 is a section taken along the line 2—2 of FIG. 1.

As can be seen particularly from FIGS. 1, 2 and 3, a housing part 1 which receives the driving motor 20 is made of a suitable plastic and forms, together with a handle part 2, a one-piece assembly representing the total housing.

A metal jacket 3 which is surrounded on all sides by plastic, is injected into this assembly. As shown in FIG. 3, metal jacket 3 contains a centering cylinder 5 for the cylinder bush (not shown) which receives the working piston and the striking mechanism. The centering cylinder 5 is provided with guide lugs 6 at the handle end along its circumference. Furthermore, metal jacket 3 has a bore 7 for supporting the intermediate shaft and bearing receivers 8 and 9 for an eccentric shaft 11, and it also delineates a space 10 for receiving the cross-gear, for example, in the form of an angle gear 13 (FIG. 4). An intermediate gear 12 also extends into the space 10.

Metal jacket 3 and its bearing receivers 8 and 9 for eccentric shaft 11 are designed so that the eccentric shaft is inclined to a vertical or horizontal plane extending through the longitudinal housing axis. Bearing 9 of the eccentric shaft is designed so that the space 10 surrounding the cross-gear or angle gear 13 is separated from a lubricant-tight crank space 14. In addition, an opening 15 is provided on the top side of the housing through which the crank space 14 is accessible. This opening is closed by a plastic cover 16.

Figure 5:
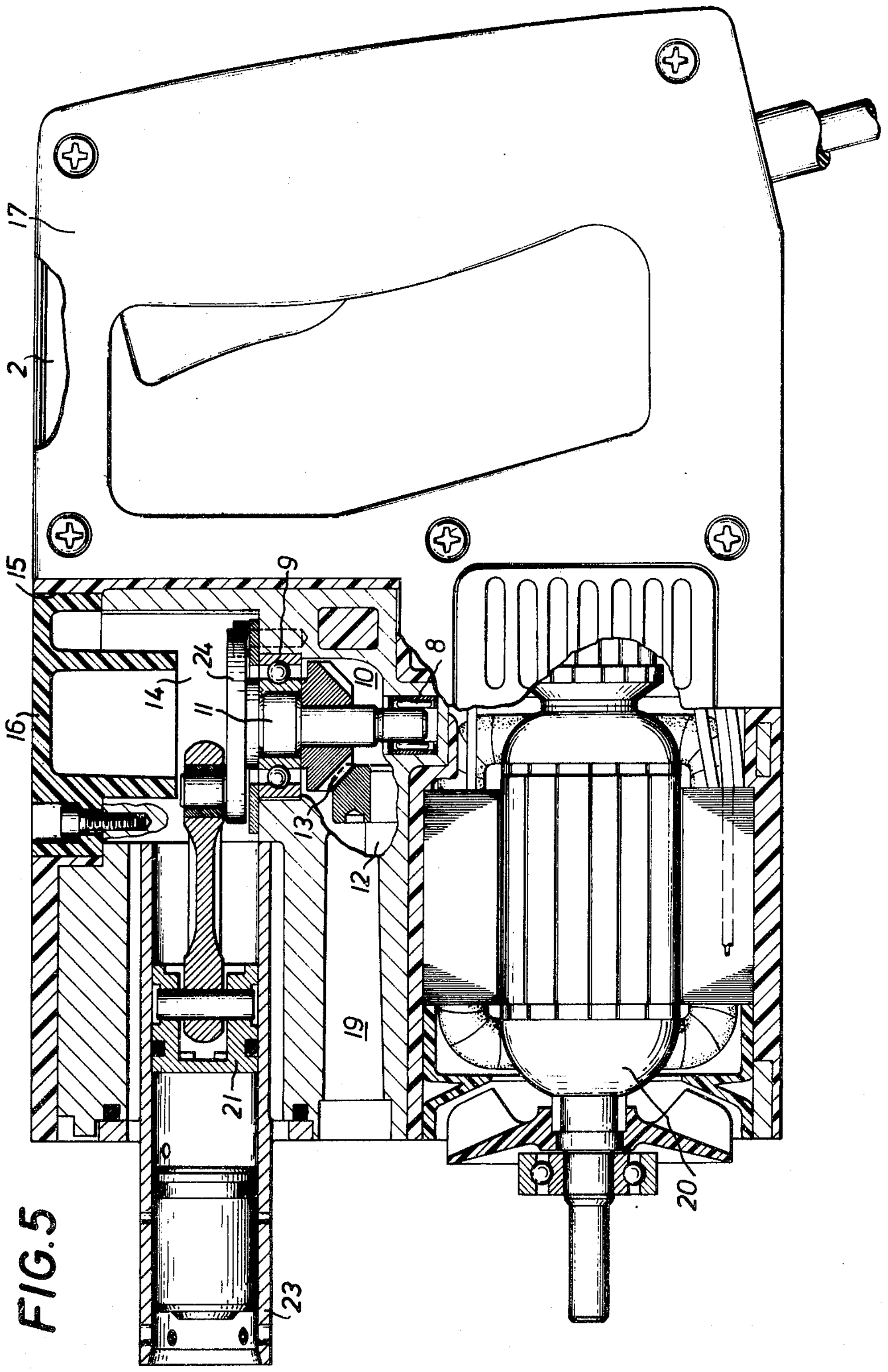
FIG. 5 is a side elevational view, partly in section, of the complete housing.

A handle cover or shell 17 covers a switch-, collector- and-brush holder-compartment 50 arranged in handle part 2 (FIGS. 1 and 5).

A grease chamber 19 for the lubricant supply of the angle gear is arranged next to a cylindrical wall 18 surrounding intermediate shaft 12 (see FIGS. 3 and 5). An eccentric 24 which actuates working piston 21 arranged in cylinder bush 23 is combined with eccentric shaft 11. The overhung striking body 22 is influenced by working piston 21 so that it performs a reciprocating movement and acts in air as a medium directly or indirectly on a tool (not shown) alongside the cylinder bush. The compressible air acts on an overhung striking body (also not shown).

While a specific embodiment of the invention has been shown and described in detail to illustrate the application of the principles of the invention, it will be understood that the invention may be embodied otherwise without departing from such principles.

What is claimed is:

1. A housing for a hammer drill having a drive motor driving an eccentric shaft through an intermediate shaft having an intermediate gearing to reciprocate a driving piston which acts periodically through a compressible medium on an overhung striking body, comprising a one-piece integral plastic housing having a handle part and a hollow housing part including an electric motor cavity and a driving piston cavity arranged in substantially spaced apart relationship and having respective openings extending outwardly in a direction away from said handle part, a metal cylinder in said driving piston receiving cavity for guiding the driving piston therein, said hollow housing part also including a gear and eccentric drive cavity between said electric motor cavity and said cylinder, said eccentric drive cavity including a bearing bush portion for the eccentric shaft, a bore for the support of the intermediate shaft, and an interior space for the intermediate gearing.

2. A housing for a hammer drill, according to claim 1, wherein said bearing bush portions for said eccentric shaft are arranged so that the central axis is inclined to a plane extending through the longitudinal axis of said housing.

3. A housing for a hammer drill, according to claim 1, wherein said eccentric drive cavity includes a crank space portion and a gear space portion for the intermediate gearing, said gear space portion being separated lubricant-tight from said crank space portion.

4. A housing for a hammer drill, according to claim 3, wherein said hollow housing part includes a top side having an opening into said crank space.

5. A housing for a hammer drill, according to claim 1, wherein said hollow housing part includes a grease chamber for a lubricant supply, said gear and eccentric drive cavity including a gear chamber arranged alongside said lubricant supply, said housing having a cylindrical wall defining a spot for said intermediate shaft arranged adjacent said gear cavity.

* * * * *